United States Patent [19]

Horrell

[11] Patent Number: 5,647,413

[45] Date of Patent: Jul. 15, 1997

[54] SCOOP ASSEMBLY FOR GRANULAR MATERIALS AND METHOD OF USE

[75] Inventor: Robin S. Horrell, Wyoming, Ohio

[73] Assignee: The Procter & Gamble Company, Cincinnati, Ohio

[21] Appl. No.: 600,906

[22] Filed: Feb. 13, 1996

[51] Int. Cl.$^6$ .................................................. B65D 79/00
[52] U.S. Cl. .............................. 141/108; 53/474; 53/525; 206/216; 141/1; 141/9; 141/100
[58] Field of Search ........................ 141/108, 109, 141/1, 9, 100; 294/55; 206/216, 229; 53/154, 238, 239, 445, 474, 525; 220/574.1; 215/391, DIG. 5

[56] References Cited

U.S. PATENT DOCUMENTS

| | | | |
|---|---|---|---|
| 1,514,379 | 11/1924 | Fleischer | 206/229 |
| 1,708,456 | 4/1929 | Tunick | 206/216 X |
| 2,682,465 | 6/1954 | Wiitala et al. | 95/88 |
| 2,738,900 | 3/1956 | Wenger | 215/DIG. 5 |
| 3,287,806 | 11/1966 | Kellerman | 206/229 X |
| 3,311,226 | 3/1967 | Oliver | 206/216 |
| 3,330,091 | 7/1967 | Quinn | 53/474 |
| 3,360,121 | 12/1967 | Zoeller et al. | 206/216 |
| 4,632,441 | 12/1986 | Dunlap | 204/1.1 |
| 4,930,645 | 6/1990 | Warehime | 215/11.1 |
| 5,042,712 | 8/1991 | DeRoseau | 220/574.1 X |
| 5,064,073 | 11/1991 | Folland | 220/359 |
| 5,074,429 | 12/1991 | Konkel et al. | 206/229 X |
| 5,445,022 | 8/1995 | Vassallo | 73/426 |

FOREIGN PATENT DOCUMENTS

| | | | |
|---|---|---|---|
| 1542-463 | 3/1979 | United Kingdom | 215/DIG. 5 |

*Primary Examiner*—J. Casimer Jacyna
*Attorney, Agent, or Firm*—Ronald W. Kock

[57] ABSTRACT

A scoop assembly capable of being lifted through a granular material to a headspace of an upright container from a location in the container below the headspace when the granular material is fluidized by shaking the container along a substantially vertical axis. A scoop assembly has a handle portion connected to a measuring portion. The measuring portion has a cavity which is covered by a removable cover which prevents granular material entering the cavity before the scoop assembly is lifted into the headspace. The scoop assembly has an outer shape which is streamlined to enhance lifting speed. A method of lifting a scoop assembly through a granular material to a headspace of an upright container from a location in the container below the headspace comprises the steps of placing a scoop assembly in the upright container from an open end of the container; filling granular material into the container from the open end and covering the scoop assembly with granular material, but leaving a headspace above the granular material within the container; and shaking the upright container along a substantially vertical axis to fluidize the granular material for a sufficient time in order to lift the scoop assembly into the container headspace.

7 Claims, 4 Drawing Sheets

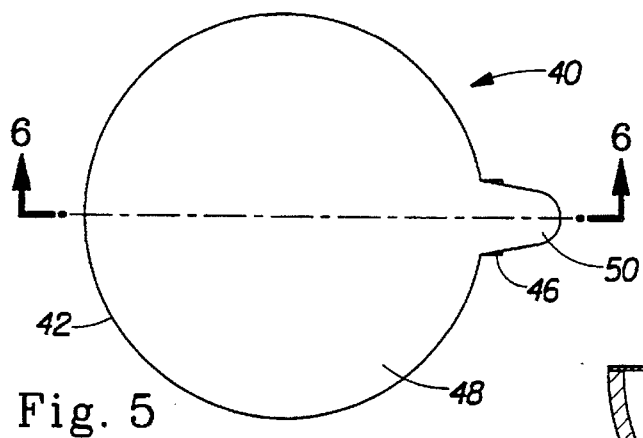
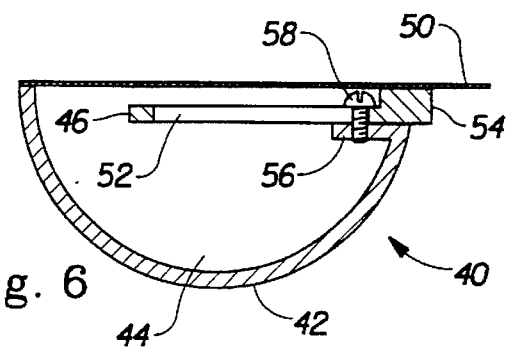
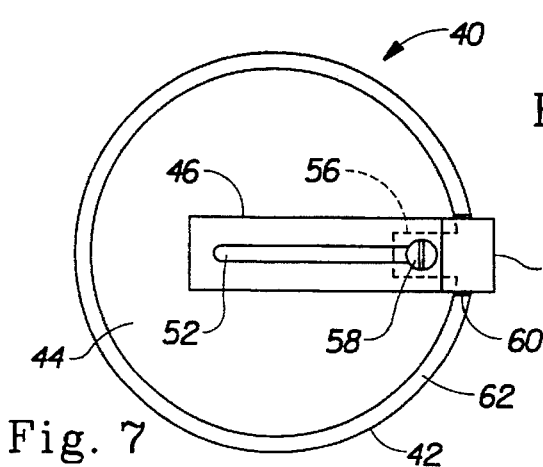
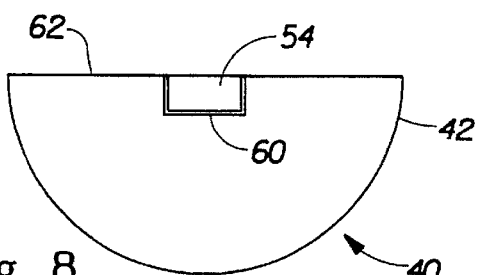
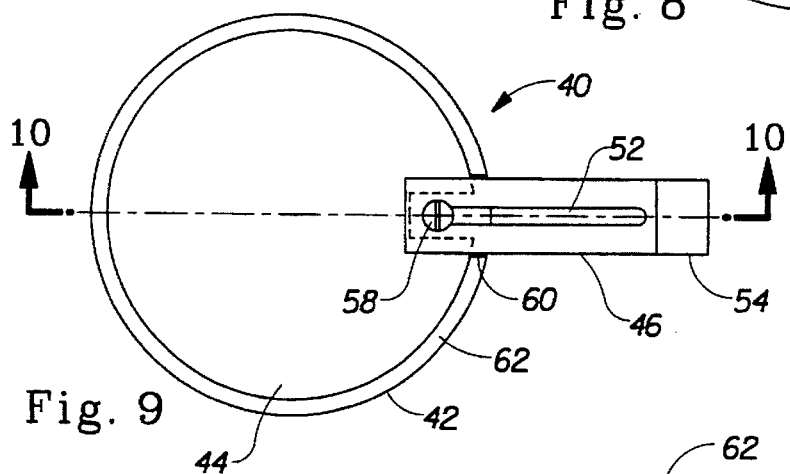
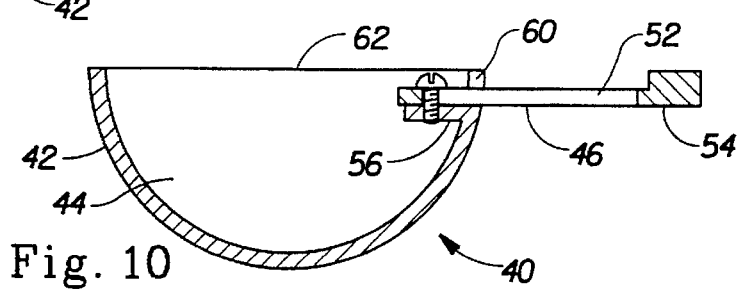

SCOOP ASSEMBLY FOR GRANULAR MATERIALS AND METHOD OF USE

FIELD OF THE INVENTION

The present invention relates to scoops used for measuring and removing granular materials from containers, and more particularly to plastic scoops which are packed in containers along with granular materials. Even more particularly, the present invention relates to such scoops wherein the container is filled from the same end that the consumer opens the container, and wherein headspace in the container is too small for a scoop to rest atop the granular material.

BACKGROUND OF THE INVENTION

Measuring scoops for granular products, which are placed in packages for user convenience in volumetric measuring, are old in the art. Such scoops are found particularly with granular detergent and coffee products, where volumetric measuring is beneficial to obtaining reproducible results. Measuring scoops typically are molded of plastic and have a measuring portion connected to a handle portion. The measuring portion typically has a cylindrical or rectangular body surrounding an open cavity of the same shape.

Scoops are designed to be placed in the top of a container in one of two ways. In a first method, the container is filled with granular product and then a small scoop is placed on top of the product before the container lid is installed. In a second method, the container is inverted with top down. The scoop is then placed in the container. The scoop is then covered by filling a granular product around it. The container bottom is thereafter installed. When the container is reinverted, the scoop is at the top end of the container where the lid will be opened by the consumer. The second method is preferable where the scoop is large relative to the size of the container or where the container is shaped to have a headspace which will not accommodate dropping in a scoop on top of the product.

In the coffee business, containers for ground coffee have traditionally been vacuum packed or pressure packed metal cans. Such cans are cylindrical and have ends seamed onto both ends. This design lends itself well to the second method of scoop placement. However, more recently, molded plastic bottles are being considered for ground coffee. The plastic bottles are designed to look like cans. The key difference is that a bottle has only one open end. It is filled and emptied through the same open end. Thus, the second method of placing a measuring scoop is not available without some method of causing a scoop placed in the bottle bottom to later rise to the top of the bottle.

A *Discover* magazine article discusses size separation within a can of mixed nuts. According to the article, "shaking a can of mixed nuts sets up a nut current in the whole can that looks like the convective roll of boiling water." When small glass beads are placed in a jar with one large glass bead, shaking the container sets up a current flow within the container such that beads against the container wall move downward, while beads that are one or two bead diameters inside the container wall move upward. The large bead is lifted to the surface of the beads where it stays while the smaller beads move radially to the surface of the container and then downward. Shaking is believed to be the driving force for the currents within the beads. The author believes that wall friction is the key to size separation, because in a nearly frictionless walled container, no current or flow of beads was initiated. In the case of canned nuts, size-based separation is an undesirable consequence.

It is an object of the present invention to apply the mixed nut size separation phenomenon to cause a submerged measuring scoop to rise through granular material in a container to the container headspace, where the scoop is available to be used by a consumer to remove measured volumes of granular material.

It is a further object of the present invention to provide a measuring scoop which is designed to minimize the time or effort required to lift a scoop from the bottom of a container to the headspace of the container when the container is filled with a granular product.

SUMMARY OF THE INVENTION

If a scoop behaves as if it were buoyant, and the granular material surrounding the scoop acts as a fluid, the scoop could be expected to rise in the granular material. In practicing the present invention, the granular product is shaken to fluidize it. The scoop may be made buoyant by making it lightweight and by sealing a peelable cover over the open end of the scoop cavity so that the scoop displaces a greater amount of granular material than would an open scoop. However, buoyancy is not the primary phenomenon believed responsible for lifting a scoop in fluidized granules. Fluid currents in the granular product are believed to provide the primary lifting force. Fluidizing granules in a container to lift a scoop is best achieved by shaking the upright container along a substantially vertical axis. Even a spherical shell having a weight three times greater than the weight of granular material displaced by the shell can be made to rise to the top of a container of granular material by vertical shaking. Shaking the container perpendicular to a vertical axis will also fluidize granules. When granules are fluidized by a shaking motion having no vertical component, buoyancy of the scoop or shell is believed necessary for lifting to occur.

The scoop assembly of the present invention is designed to be buoyant because buoyancy is believed to improve lifting performance regardless of the orientation of the shaking motion. Also, it is believed that low friction between fluidized granules and the scoop assembly improve its lifting performance. The shape of the scoop is therefore made streamlined so that it offers minimal drag when moving through the granules. For example, the handle of the scoop assembly is preferably positioned inside the cavity of the scoop until it is needed for measuring.

The scoop assembly is designed as nearly spherical as is practical because a spherical shape is believed to provide the lowest fluid friction. Also, once a device is lifted to the headspace of a container, there is a tendency for currents to cause it to recirculate in the container; that is, to submerge again. The spherical shape has been found to minimize the tendency for recirculation, and therefore offers stability to a lifted scoop assembly or other device.

In one aspect of the present invention, a scoop assembly is capable of being lifted through a granular material to a headspace of an upright container from a location in the container below the headspace when the granular material is fluidized by shaking the container along a substantially vertical axis. The scoop assembly comprises a measuring portion having a cavity and a removable cover covering the cavity, which prevents granular material entering the cavity before the scoop assembly is lifted to the headspace. The removable cover may comprise a peelable film adhesively connected to the measuring portion all around the cavity.

A handle portion may also be connected to the measuring portion. The handle portion may be connected to the measuring portion such that the handle portion is movable by a user in and out of the cavity between a storage position and a use position.

The scoop assembly has an outer shape which is substantially streamlined to enhance lifting speed of the scoop assembly in the granular material. Also, the scoop assembly may displace a weight of granular material greater than a weight of the scoop assembly, in order to enhance lifting speed of the scoop assembly in the granular material.

In another aspect of the present invention, a device is capable of being lifted through a granular material to a headspace of an upright container from a location in the container below the headspace when the granular material is fluidized by shaking the container. The device comprises an article of manufacture and a hollow shell surrounding the article of manufacture. The hollow shell is openable to remove the article of manufacture therefrom. The hollow shell may have a spherical outer shape, and the article of manufacture may comprise a measuring scoop.

The device may displace a weight of granular material greater than a weight of the device, in order to enhance lifting speed of the device in the granular material. Alternatively, if the device has a spherical shape, the device may displace a weight of granules less than one third the weight of the device and still rise in the granular material to the headspace of the container when shaken along a substantially vertical axis.

In still another aspect of the present invention, a method of lifting a device through a granular material to a headspace of an upright container from a location in the container below the headspace comprises the steps of placing the device in the upright container from an open end of the container; filling granular material into the container from the open end and covering the device with the granular material while leaving a headspace above the granular material; and shaking the upright container to fluidize the granular material for a sufficient time in order to lift the device into the headspace. The container is shaken along a substantially vertical axis to enhance lifting speed. Also, the device has an outer shape which is substantially streamlined to enhance lifting speed. Furthermore, the device displaces a weight of granular material greater than a weight of the device, in order to enhance lifting speed. Closing the container to prevent granular material exiting the container when the container is shaken may be another step. The device may comprise a measuring scoop assembly. The measuring scoop assembly may comprise a measuring portion having a cavity and a removable cover such as a peelable film adhesively attached to the measuring portion to cover the cavity; or the measuring scoop assembly may comprise an openable hollow shell surrounding a measuring scoop.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

FIG. 5 is a top plan view of a preferred scoop assembly of the present invention, showing a peelable film coveting the cavity of a hemispherical scoop;

FIG. 6 is a sectioned front elevation view thereof, taken along section line 6—6 of FIG. 5, showing the peelable film and a sliding handle recessed into the scoop cavity;

FIG. 7 is a top plan view thereof, showing the peelable film removed so that the sliding handle is visible;

FIG. 8 is a fight side elevation view thereof, showing the end of the recessed sliding handle;

FIG. 9 is a top plan view thereof, showing sliding handle in its extended position for using with the scoop;

FIG. 10 is a sectioned front elevation view thereof, taken along section line 10—10 of FIG. 9, showing the sliding handle extended;

DETAILED DESCRIPTION OF THE INVENTION

Figure 1:
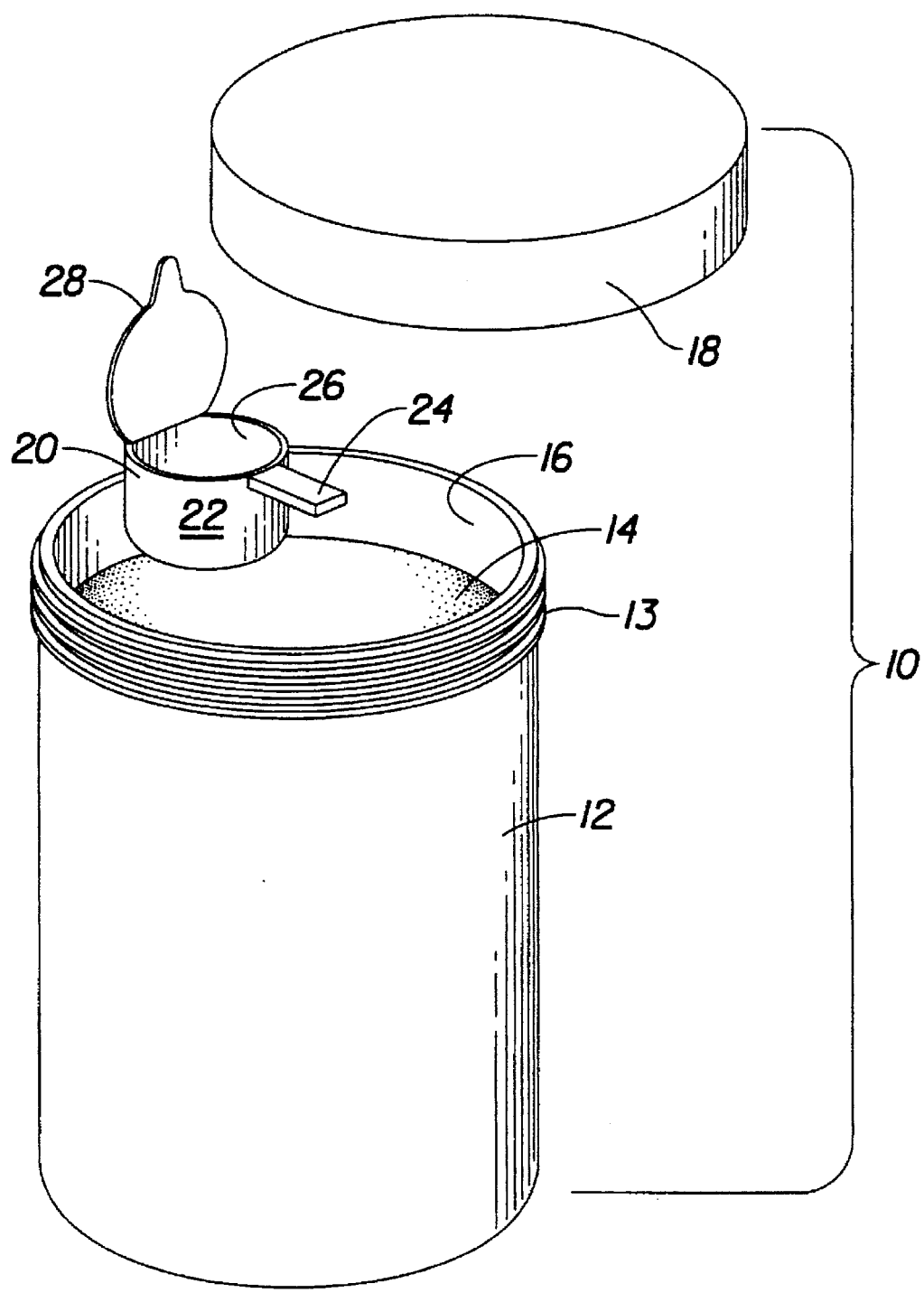
FIG. 1 is an exploded perspective view of a preferred embodiment of the granular material container and scoop assembly of the present invention, disclosing a cylindrical wide-mouth bottle having a screw-on closure, which is removed to show a small headspace and a scoop having a handle and a peelable film covering the scoop cavity.

Referring now to the drawings, and more particularly to FIG. 1, there is shown a first preferred embodiment of the present invention, which provides a combination of a scoop assembly and a container of granular material having only one openable end and a threaded closure, and is generally indicated as 10. Combination 10 includes container 12, granular material 14 within container 12, headspace 16 located between the upper surface of granular material 14 and the open top of container 12, container closure 18, and scoop assembly 20. Container 12 preferably has threads 13 and closure 18 preferably has mating threads, not shown in FIG. 1. Container 12 may be a plastic or glass bottle or a metal can. Preferably container 12 has a wide mouth nearly the same diameter as the body of the container. Closure 18 may be a plastic or metal closure, which may be seamed or snapped onto container 12 rather than being threaded thereon.

Scoop assembly 20 includes measuring portion 22 and handle portion 24, which are connected. Measuring portion 22 has a cavity 26 preferably covered by a peelable film 28, which is adhesively sealed to measuring portion 22 when scoop assembly 20 is first placed into container 12. In FIG. 1 peelable film 28 is shown partially peeled off measuring portion 22 to expose cavity 26. Peelable film 28 is preferably not removed from scoop assembly 20 until a user first opens closure 18 and lifts scoop assembly 20 from container 12. Once peelable film 28 is removed, the user may grip handle portion 24 and dip measuring portion 22 into granular material 14, filling cavity 26. The user may then remove measuring portion 22 from granular material 14 with cavity 26 still filled with granular material 14, so that a measured volume of granular material 14 is thereby removed from container 12. Scoop assembly 20 may then be placed in headspace 16 and peelable film 28 discarded. Closure 18 may then be replaced onto container 12 to seal granular material 14 from moisture. Alternatively, scoop assembly 20 may be placed elsewhere for later use.

Figure 2:
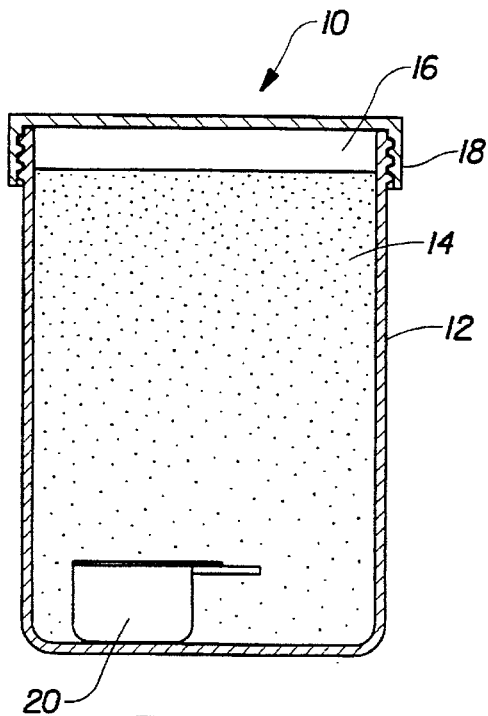
FIG. 2 is a sectioned side elevation view of the container and scoop assembly of FIG. 1, showing the scoop assembly located at the bottom of the container and covered by granular material.

FIG. 2 shows scoop assembly 20 initially placed in the bottom of container 12, where it is then covered with granular material 14. Both scoop assembly 20 and granular material are inserted from the open top end of container 12. After filling, threaded closure 18 is threaded onto the open end of container 12 to seal container 12 closed. Granular material 14 is not filled to the very top of container 12, typically to prevent spillage of material 12 in an automatic filling system before closure 18 is installed. Thus, headspace 16 is left at the top of container 12. Headspace 16 is believed beneficial to the rapid lifting of scoop assembly 20 within granular material 14. Headspace 16 may be filled with air or another gas which replaces the air in order to prevent oxidation of granular material 14 during storage in container 12. Headspace 16 may alternatively be partially evacuated.

Figure 3:
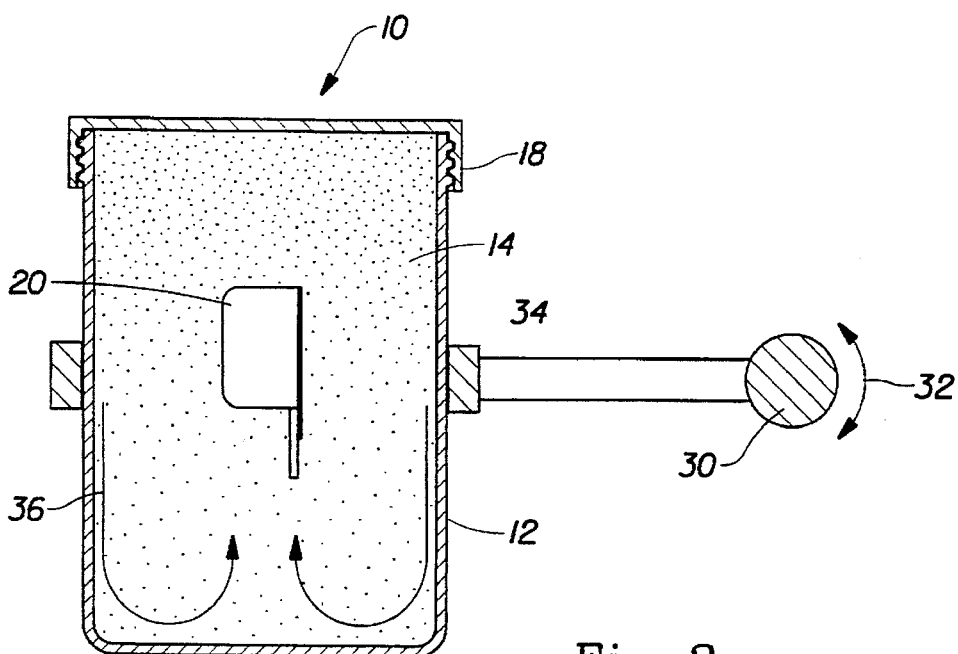
FIG. 3 is a sectioned side elevation view of the container and scoop assembly of FIG. 1, showing a portion of a wrist action shaker shaking the container to fluidize the granules to lift the scoop assembly through the granular material.

FIG. 3 shows an oscillating pivot arm 30 having oscillations 32. Connected to oscillating pivot arm 30 is a gripper 34, which holds container 12 upright, preferably about a midpoint of container 12. Under the influence of oscillations 32, which provide shaking of container 12 substantially along a vertical axis of container 12, granular material 14 is fluidized within container 12. That is, granular material 14 first rises to fill headspace 16 and then falls back to its original position with each shake. It is believed during fluidization that granular material 14 essentially disperses throughout the full volume of container 12, as depicted in FIG. 3, and the gas in headspace 16 mixes with granules 14 to help individual granules move relative to each other.

Shaking container 12 by hand or by oscillations 32 transmitted from arm 30 through gripper 34 causes currents 36 to be generated in granules 14. Currents 36 are believed to move downwardly along the inner wall of container 12 and upwardly around the vertical axis of upright container 12. Currents 36 are believed responsible for lifting scoop assembly 20 in granular material 14 from the bottom of the container to the top of the container. Alternatively, granules 14 may be fluidized by shaking container 12 along axes which are not substantially vertical. As long as there is a vertical component to the shaking motion, or scoop assembly 20 is buoyant in fluidized granules 14, scoop assembly 20 can be expected to slowly rise in granules 14. However, the rate of lifting will be less than for shaking along a vertical axis.

Figure 4:
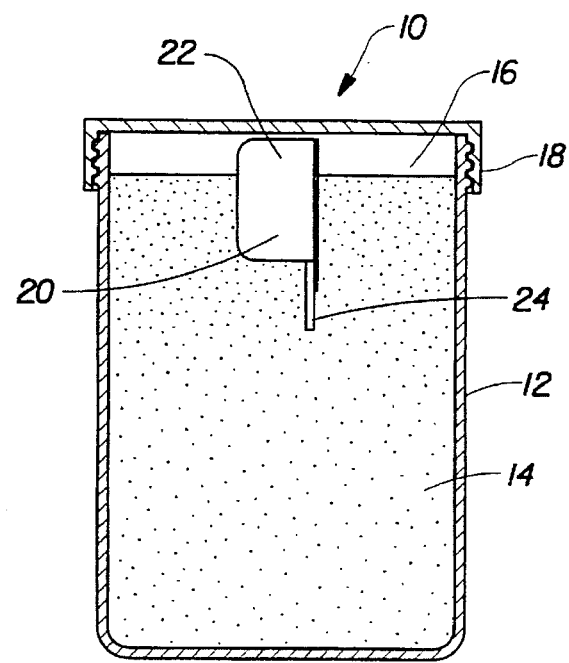
FIG. 4 is a sectioned side elevation view of the container and scoop assembly of FIG. 1, showing the scoop assembly located at the headspace of the container, yet partially submerged in granular material.

FIG. 4 shows container 12 removed from gripper 34 after shaking has ceased. Granular material 14 settles back to the bottom of container 12 leaving headspace 16. Scoop assembly 20 meanwhile has risen to headspace 16. When a user removes closure 18, the user will find a scoop assembly 20 partially buried in granular material 14 in headspace 16. The user may easily lift scoop assembly 20 from granular material 14 by gripping the portion of scoop assembly 20 which resides in headspace 16. Typically that portion will be measuring portion 22 because handle portion 24 tends to be oriented below the more buoyant and streamlined measuring portion 22.

FIGS. 5–10 show an alternative scoop assembly, generally indicated as 40. The preferred scoop assembly has a streamlined shape, approximating a sphere. Scoop assembly 40 has a measuring portion 42 which has a cavity 44. Scoop assembly 40 also has a handle portion 46. Handle portion 46 is movable in and out of cavity 44. FIGS. 6–10 show a slidable handle portion, but the handle portion could also be hinged. The intent is to minimize the exposure of handle portion 46 while scoop assembly 40 is in the granular material in the container. Minimal exposure of the handle portion is believed to help streamline the scoop assembly and thereby improve the lifting performance of the scoop assembly in the granular material under a shaking stimulus.

FIG. 5 shows a substantially hemispherical measuring portion 42 from the flat top end, having a peelable film 48 adhesively attached to measuring portion 42 and covering cavity 44. Peelable film 48 preferably has a tab 50 extending beyond the perimeter of measuring portion 42, which enables a user to easily peel off film 48. Alternatively, a cover other than a peelable film may close cavity 44. For example, a snap-on plastic or cardboard cover or a snap-in plastic or cardboard plug could act to close cavity 44 from granular material. Also, a porous screen could be used to cover cavity 26, as long as granules 14 are kept out of cavity 26 while scoop assembly 20 is submerged in granules 14. However, scoop assemblies without a covered cavity 44 have been lifted by the process of vertically shaking an upright container filled with granular material.

FIG. 6 shows a sectioned side view of scoop assembly 40. Handle portion 46 is shown as a slidable member at its inner position within cavity 44. Handle portion 46 has a slot 52 and a stepped end 54. Measuring portion 42 has a lug 56 extending into cavity 44. A screw 58 is threaded through slot 52 and into lug 56. Measuring portion 42 also has a rectangular cutout 60 adjacent lug 56 through which handle portion 46 slides into cavity 44. Stepped end 54 just fills cutout 60 to close cavity 44. Because stepped end 54 is at the same height as a top edge 62 of measuring portion 42, peelable film 48 may be sealed to stepped end 54. Such sealing holds handle portion 46 at its inner position until a user peels film 48 off measuring portion 42.

FIGS. 7 and 8 show scoop assembly 40 with peelable film 48 removed. As in FIG. 6, handle portion 46 is shown at its inner position, within cavity 44.

FIGS. 9 and 10 show scoop assembly 40 with handle portion 46 extended to its outer position. The user manipulates handle portion 46 by pulling outwardly on stepped end 54, or otherwise gripping handle portion 46 inside cavity 44 and sliding it outwardly to the end of slot 52. In the outer position, handle portion 46 is easily gripped for scooping measuring portion 42 into granular material. When the user is done scooping and measuring, handle portion 46 may be moved back into cavity 44 or it may be leer in its outer position for storage.

Figure 11:
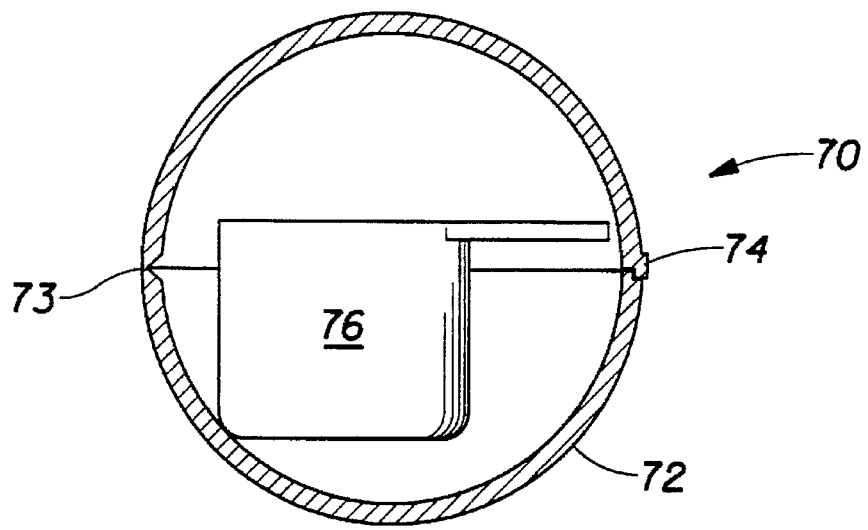
FIG. 11 is a sectioned front elevation view of an alternative embodiment of the scoop assembly of the present invention, showing a spherical shell closed around an open scoop.
Figure 12:
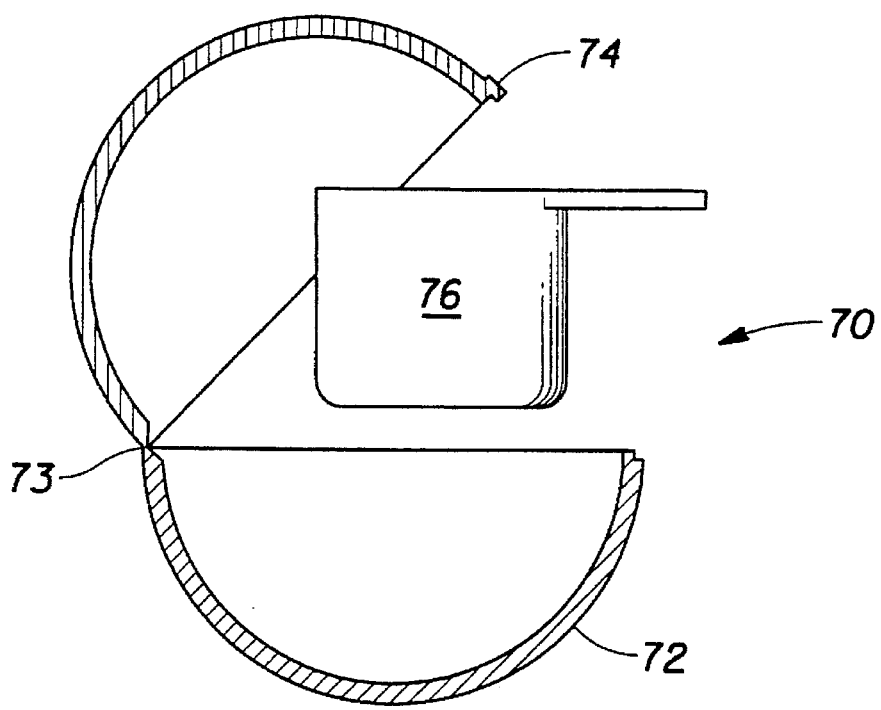
FIG. 12 is a sectioned front elevation view thereof, showing the spherical shell hinged open for removal of the open scoop.

FIGS. 11 and 12 show another embodiment of the present invention, generally indicated as 70. Embodiment 70 is a hollow shell 72, which has a hinge 73 on one side and a friction latch 74 on an opposite side. Hollow shell 72 is preferably spherical in outer shape and it contains a scoop 76 within it. When shell 72 is unlatched and hinged open, scoop 76 may be removed for use. Scoop 76 needs no cover. Although not shown, hollow shell 72 may be placed in granular material 14 and container 12 of FIGS. 1–4, replacing scoop assembly 20. Upon shaking container 12, hollow shell 72 would behave just like scoop assembly 20 and be lifted to headspace 16. However, if hollow shell 72 is spherical in shape, it would be lifted faster than scoop assembly 20 because it has a more streamlined shape than scoop assembly 20. On the other hand, embodiment 70 is likely to be more expensive than scoop assembly 20.

As an alternative to or in addition to having scoop 76 in hollow shell 72, prizes, coupons, or other items useful to the user may be placed hollow shell 72. Moreover, scoops with movable handles may be placed within hollow shell 72. With handle portion 46 moved to its inner position, a smaller hollow shell 72 would be needed than for a scoop with a fixed handle portion that extends from the measuring portion.

A spherical shell has been found capable of being lifted under substantially vertical axis shaking even when the spherical shell contains an article of manufacture which causes the assembly to have as much as three times the density as the bulk density of the granular material 14.

In a particularly preferred embodiment of the present invention, as illustrated in FIGS. 1–4, scoop assembly 20 has a 25 ml cavity 26. Handle portion 24 extends about 20 mm from measuring portion 22. Measuring portion 22 has an outer height of 25 mm. Handle portion 24 and measuring portion 22 are molded of polyethylene, and together weigh about 5 grams. Peelable film 28 is made of a 0.05 mm thick polymer coated aluminum foil, which has negligible weight.

Container 12 is preferably cylindrical in shape, being 130 mm tall and 75 mm in diameter. Granular material is preferably filled to within 15 mm of the top of container 12, leaving a headspace 16 of 15 mm in depth. Granular material 14 is preferably ground coffee. Granular material 14 preferably has a bulk density of 0.1 to 1.0 gm/ml and an average granule size of 900 microns.

Container 12 is preferably shaken at an amplitude of 20 mm, as measured at the container, by means of a Model 75 Wrist Action Shaker, made by Burrell Corp. of Pittsburgh, Pa. A shaking time of 20 seconds is necessary to lift the preferred scoop assembly from container bottom to headspace through the preferred granular material in the preferred container. The center of container 12 is approximately 13 cm from the centerline of rotation of wrist action shaker arm 30. The frequency of shaking is preferably in the range 120–180 cycles per minute.

The following are observations made concerning the behavior of scoop assembly 20:

The frequency and amplitude of shaking appear to be the most important variables in the determination of time of lifting for a given container, granular material, and scoop assembly. In addition, the granular material must be relatively dry and capable of being fluidized. Also, a headspace depth at least as great as the amplitude of shaking is desired. With no headspace there is typically no lifting. Excessive frequency or amplitude of shaking can cause the scoop assembly to rise quickly and then resubmerge. The currents may be so strong that they recirculate the scoop assembly. Profiling the shaking amplitude is beneficial. For example, if shaking is initiated at an amplitude that lifts the scoop assembly in 10 seconds, but operates for only 5 seconds, the scoop assembly rises halfway. A reduced amplitude that would cause the scoop assembly to rise in 20 seconds is then applied for 10 seconds to lift the scoop assembly the rest of the way, for an overall lifting time of 15 seconds. However, the reduced amplitude during the second half of lifting provides stability to the scoop assembly once it is located at the headspace, so that it does not resubmerge.

The space between a scoop assembly and the inner wall of the container is also believed to be important, since there are downward currents at the wall and upward currents along the container axis. Having both currents acting on a scoop assembly at the same time hinders lifting. Using the preferred granular material, a preferred space between scoop assembly and inner wall is 20 mm. A straight, parallel-walled container is preferred over one having radial contours, so that the fluidization of granular material is uniform. Contours may cause turbulence in the currents, which may trap the scoop assembly and prevent lifting.

There is indication that inertial effects may also influence lift rate. A spherical shell with a heavy object inside may rise faster when the internal object bounces around inside the shell. Upon an upward thrust, the heavy object develops upward momentum and then impacts the inside of the shell to boost it upward just as the shaking cycle reverses.

In containers which are opaque, the completion of lifting of a scoop assembly may be determined by the audible contact of the scoop assembly with the underside of the container closure.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is chimed is:

1. A scoop assembly capable of being lifted through a granular material to a headspace of an upright container from a location in said container below said headspace when said granular material is fluidized by shaking said container along a substantially vertical axis, said scoop assembly comprising a measuring portion having a cavity substantially void of granular material, said cavity being covered by a removable cover which prevents granular material entering said cavity before said scoop assembly is lifted to said headspace, said scoop assembly also having a handle portion connected to said measuring portion such that said handle portion is slidable by a user in and out of said cavity between a storage position and a use position.

2. The scoop assembly of claim 1 wherein said scoop assembly displaces a weight of granular material greater than a weight of said scoop assembly, in order to enhance lifting speed of said scoop assembly in said granular material.

3. The scoop assembly of claim 1 wherein said removable cover comprises a peelable film adhesively connected to said measuring portion all around said cavity.

4. A method of lifting a device through a granular material to a headspace of an upright container from a location in said container below said headspace, said method comprising the steps of:
   a) placing said device in said upright container from an open end of said container;
   b) filling granular material into said container from said open end and covering said device with said granular material, said filling step leaving a headspace above said granular material within said container; and
   c) shaking said upright container to fluidize said granular material for a sufficient time in order to lift said device into said headspace, and wherein said device comprises a measuring scoop assembly.

5. The method of claim 4 wherein said measuring scoop assembly comprises a measuring portion having a cavity, and a removable cover covering said cavity, said removable cover preventing granular material entering said cavity before said scoop assembly is lifted into said headspace.

6. The method of claim 5 wherein said removable cover comprises a peelable film adhesively attached to said measuring portion.

7. The method of claim 4 wherein said measuring scoop assembly comprises a hollow shell surrounding a measuring scoop, said hollow shell being openable to remove said measuring scoop.

* * * * *